United States Patent [19]
Bliss

[11] Patent Number: 5,748,217
[45] Date of Patent: May 5, 1998

[54] CHARGE COMPENSATION CIRCUIT FOR AN ELECTROSTATIC WRITING HEAD

[75] Inventor: Arthur E. Bliss, Sunnyvale, Calif.

[73] Assignee: Phoenix Precision Graphics, Inc., Sunnyvale, Calif.

[21] Appl. No.: 558,876

[22] Filed: Nov. 16, 1995

[51] Int. Cl.[6] .............................. G03G 15/01; B41J 2/05
[52] U.S. Cl. ........................ 347/141; 340/652; 399/155
[58] Field of Search ................................ 347/141, 144, 347/148, 139, 155, 85, 86; 346/74 ES; 399/155; 355/326 R, 10; 340/652

[56] References Cited

U.S. PATENT DOCUMENTS

| | | | |
|---|---|---|---|
| 3,611,419 | 10/1971 | Blumenthal | 346/74 ES |
| 3,892,481 | 7/1975 | Schaefer et al. | 355/10 |
| 5,243,383 | 9/1993 | Parisi | 355/208 |
| 5,298,943 | 3/1994 | Ide et al. | 355/208 |
| 5,325,120 | 6/1994 | Kuehnle | 346/157 |
| 5,335,055 | 8/1994 | Bliss | 355/326 R |

*Primary Examiner*—Adolf Berhane
*Assistant Examiner*—Rajnikant B. Patel
*Attorney, Agent, or Firm*—Thomas Schneck; John P. McGuire, Jr.

[57] ABSTRACT

A power module including an RC circuit is uniquely associated with each of a plurality of electrodes of an electrostatic print head to individually control the rate of charge decay of a voltage disposed thereon. The resistor of the RC circuit is a potentiometer that may be manually adjusted to obtain an optimal decay rate. A paper supply roller and take-up roller accurately position dielectric material, such as a paper web, adjacent to the electrodes of the print head, which is located between the rollers. The electrodes are typically a plurality of wires. The print head moves across the width of paper web to dispose thereon a plurality of charge areas corresponding to a strip of a latent image. Control circuitry synchronizes the movement of the print head and the web to produce a plurality of abutting strips of charge areas, producing a complete latent image. A toner applicator is positioned downstream from the print head to dispose ionized toner particles which adhere to the plurality of charge areas, thereby producing a visible image.

20 Claims, 4 Drawing Sheets

CHARGE COMPENSATION CIRCUIT FOR AN ELECTROSTATIC WRITING HEAD

TECHNICAL FIELD

The present invention pertains to the field of color printing. Specifically, the present invention pertains to an electrostatic writing head for a color printer or copier.

BACKGROUND ART

Electrostatic printers and copiers commonly use an electrostatic writing head to deposit a latent image of electrical charges onto web of recording media having both a dielectric and conductive layer, commonly referred to as dielectric or electrostatic paper or film. The paper or film web carrying the latent image is then directed to a liquid toning applicator which deposits oppositely charged toner particles onto the paper or film web in the charged areas, thereby developing the latent image and rendering it visible.

An important consideration in controlling image quality is regulating the amount of charge deposited on the paper or film web by the head. Wide-format electrostatic printers typically use a full-width print head to deposit the latent charge on the dielectric surface of the web. To obtain high resolution printing, e.g., 400 dpi, the head must contain a large number of individual electrodes. For example, a 36 inch wide print head with a 35.2 inch written width would require 14,080 electrodes at 400 per inch. To regulate the deposited charge, each electrode has to be individually addressed by connection to a high voltage driver, thereby driving up the costs of such a print head.

To overcome the cost problems with traditional full-width print heads, multiplexing print heads were introduced. Multiplexing print heads are full-width print heads that address electrodes in groups while selecting groups by employing auxiliary electrodes. While eliminating many of the high-voltage drivers, this design introduces image anomalies commonly referred to as "multiplexing striations" which appear as dark bands. In addition, multiplex print heads operate in limited voltage ranges and exacerbate the phenomenon known as flares in electrostatic writing. Flares are spurious, unwanted charge dots which appear on the print. With multiplexing print heads, these flares are especially large and irregularly shaped, and this degrades the images which are printed on the web.

The excessive cost of a large full-width print head can also be satisfactorily addressed by using a much smaller scanning electrostatic print head. With a scanning electrostatic print head, the latent image is formed as a plurality of abutting strips or swaths of electrostatic charges on the dielectric surface of a paper or film web. Upon depositing a strip of electrostatic charge, the web is advanced the width of the strip and then a subsequent strip of charge is placed thereon. However, the scanning print head produces a banding anomaly similar to that of the multiplex print head, requiring greater control of the print electrodes. The individual writing electrodes which happen to lie near either of the two ends of the "nib" row tend to write more heavily. There may also be two or more rows of electrodes, but the banding effect normally persists.

Many prior art devices have been designed to control the electrodes of an electrostatic print head. U.S. Pat. No. 5,325,120 to Kuehnle discloses an electrostatic reproduction apparatus having an electrostatic print head for writing a pattern of electrostatic image dots on a dielectric surface. A controller regulates the voltage applied to each electrode of the electrostatic print head in response to digital data representing an original document. The controller is a variable resistor coupled to a source of voltages and functions as a voltage divider. In this manner, the voltage applied to the electrode is regulated so that the field strength between the image dots may differ to form a latent electrostatic image on the dielectric surface. The varying field strength allows the dots to contain differing amounts of ink, thereby providing a high resolution image.

U.S. Pat. No. 5,298,943 to Ide et al. discloses an electrostatic printer including a photoconductor and a main charging unit. The main charging unit creates a charge upon the photoconductor corresponding to a latent image. The photoconductor imparts the latent electrostatic image upon a paper media. A sensor is disposed proximate to the photoconductor to measure a dark and light decay character of the photoconductor. The dark and light decay character of the photoconductor is measured to determine potential variations over the surface of the photoconductor that may arise due to wear. A voltage applied to the main charging unit may be adjusted to compensate for any variations in the dark and light decay character of the photoconductor.

U.S. Pat. No. 5,243,383 to Parisi discloses an electrostatic printing machine having a charge control system that models the dark and light decay rate by measuring voltage potentials on a photoconductive surface. A charging device of the type having a coronode is disposed proximate to the image surface. The charging device includes a wire grid which produces a plurality of charge areas on the photoconductive surface, forming an electrostatic latent image. The voltage potential applied to the photoconductive surface is varied by controlling the voltage potential of the wire grid. A voltmeter is positioned to measure the surface potential of the photoconductive surface at two different points. The surface potential measured at the two points in combination with the known distance between the points provides the data necessary for determining the rate of dark decay of the charged surface. This provides an estimate of the development potential of the device.

A problem encountered with the aforementioned inventions is that the electrostatic print apparatus is typically very complicated and overly cumbersome, leading to increased cost of manufacture. What is needed is a scanning electrostatic print head that provides a graphics quality image, while avoiding the dark banding of an image which is associated with the prior art.

SUMMARY OF THE INVENTION

This object has been achieved by controlling voltage to each electrode on an electrostatic writing head so that the rate of decay of charge on each electrode may be individually controlled. A power module circuit, featuring an RC circuit, is provided such that the resistor of the RC circuit is a potentiometer that may be manually adjusted to obtain an optimal decay rate. A paper supply roller and take-up roller accurately position a dielectric surface of a paper web adjacent to the electrodes of the writing head. The electrodes typically include a plurality of wires. The writing head moves across the width of paper web to dispose thereon a plurality of charge areas forming a strip of a latent image. Control circuitry synchronizes the movement of the writing head and the web to produce a plurality of abutting strips of charge areas, producing a complete latent image. A toner applicator is positioned adjacent to the writing head to deposit oppositely charged toner particles which adhere to the plurality of charge areas, thereby producing a visible image. In the preferred embodiment, the toner applicator is located upstream, i.e. before, the writing head. The toning process occurs while moving the web in the reverse direction after creating the entire, one color, latent image as described in U.S. Pat. No. 5,335,055 to Bliss.

BEST MODE FOR CARRYING OUT THE INVENTION

Figure 1:
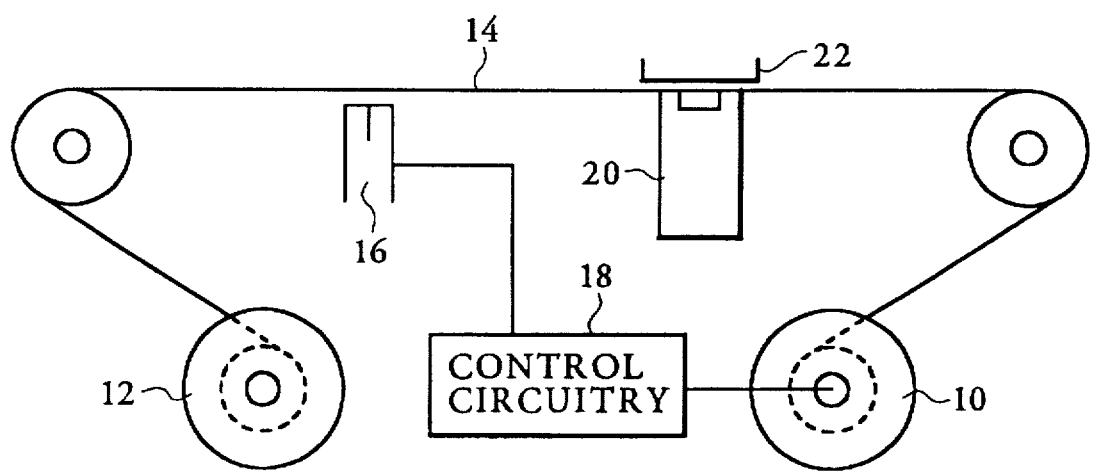
FIG. 1 is a simplified plan view of an electrostatic printing and copying apparatus utilizing a scanning electrostatic writing head in accord with the present invention.

Referring to FIG. 1, an electrostatic printing and copying system is shown in accord with the present invention. Paper supply roller 10 and take-up roller 12 accurately position a recording medium, such as paper web 14, and maintain tension in paper web 14. An electrostatic writing head 16 is located between the supply 10 and take-up 12 rollers, adjacent to a planar segment of the web 14. Writing head 16 is a scanning head which moves across the width of paper web 14, depositing strips of electrostatic charges corresponding to strips of pixels of an image, discussed more fully below with respect to FIGS. 4 and 5. Control circuitry 18 is in electrical communication with the writing head 16 to control the deposition of the electrostatic charges on the paper web 14. A toner applicator 20, located adjacent to the writing head 16, spans the width of paper web 14. Liquid toner is supplied to applicator 20 and flows across the entirety of an exposed upper applicator surface, allowing charged toner particles to adhere to the oppositely charged regions of paper web 14. A backing support 22 resides above toner applicator 20, such that paper web 14 is disposed therebetween. After creation of a latent charge image, the paper motion is reversed and toning is accomplished while re-winding the web onto supply roller 10.

Figure 2:
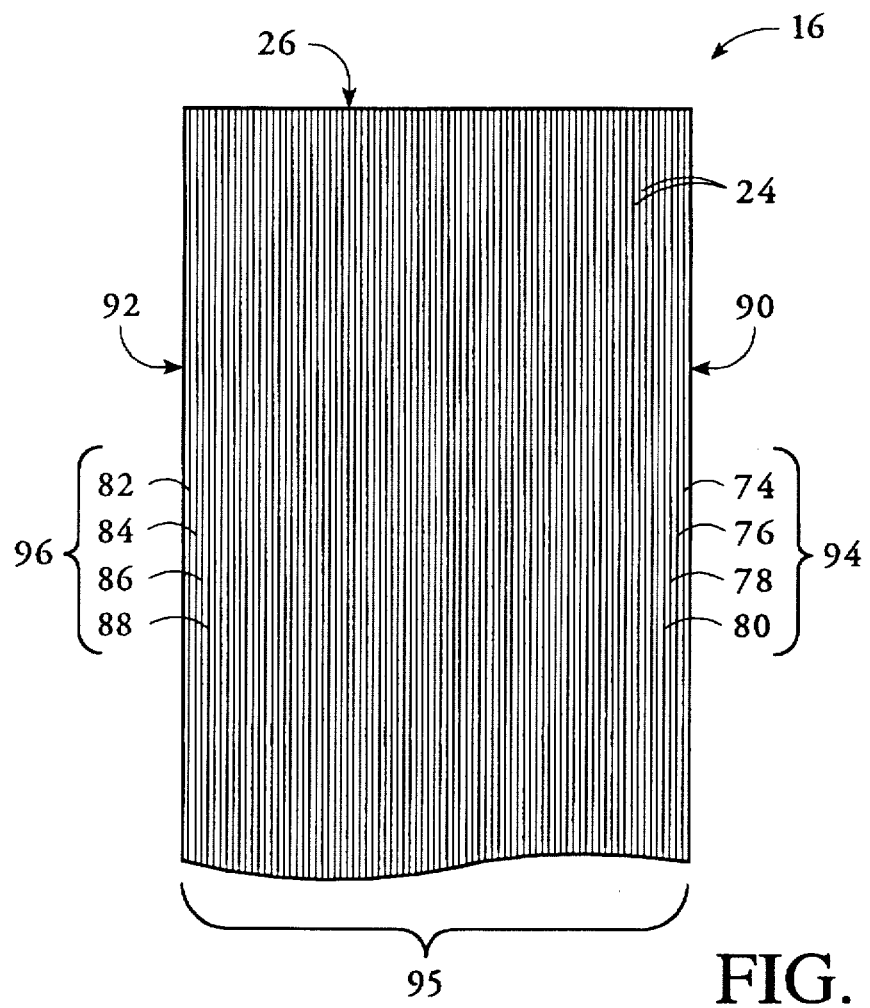
FIG. 2 is a partial side view of the scanning writing head shown in FIG. 1.
Figure 3:
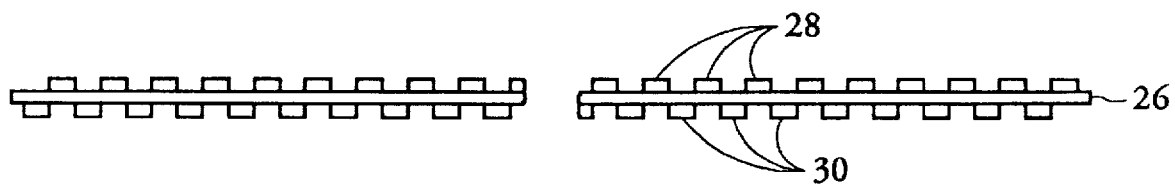
FIG. 3 is a magnified plan view of the writing head shown FIG. 2.

FIG. 2 shows the writing head 16 consisting of very fine wires or conductive traces 24 arranged as a parallel array on a thin circuit board 26. The wires or traces 24 function as electrodes, one end of which contacts the image receiving web for deposition of the latent charge image. The array of parallel wires or traces 24 extend completely across the board 26, on upper and lower surfaces, shown more clearly in FIG. 3, wherein the board 26 is shown on end. The writing head 16 includes an upper set of wires or traces 28 and a lower set of wires or traces 30. The board 26 is approximately 12.5 mils thick. The wires or electrodes are positioned at a combined density of more than 150 wires per centimeter or about 400 wires per inch, with 512 wires per side and an air or other insulative gap between adjacent wires so that they do not short together. As may be seen, the wires are slightly offset from each other, with a total of 1024 wires on two sides. This number is convenient for digital processing. With this configuration, the writing head 16 produces a 2.56 inch strip or swath of charge across the width of the web 14, creating a latent electrostatic image providing a resolution of 400 dpi.

Figure 4:
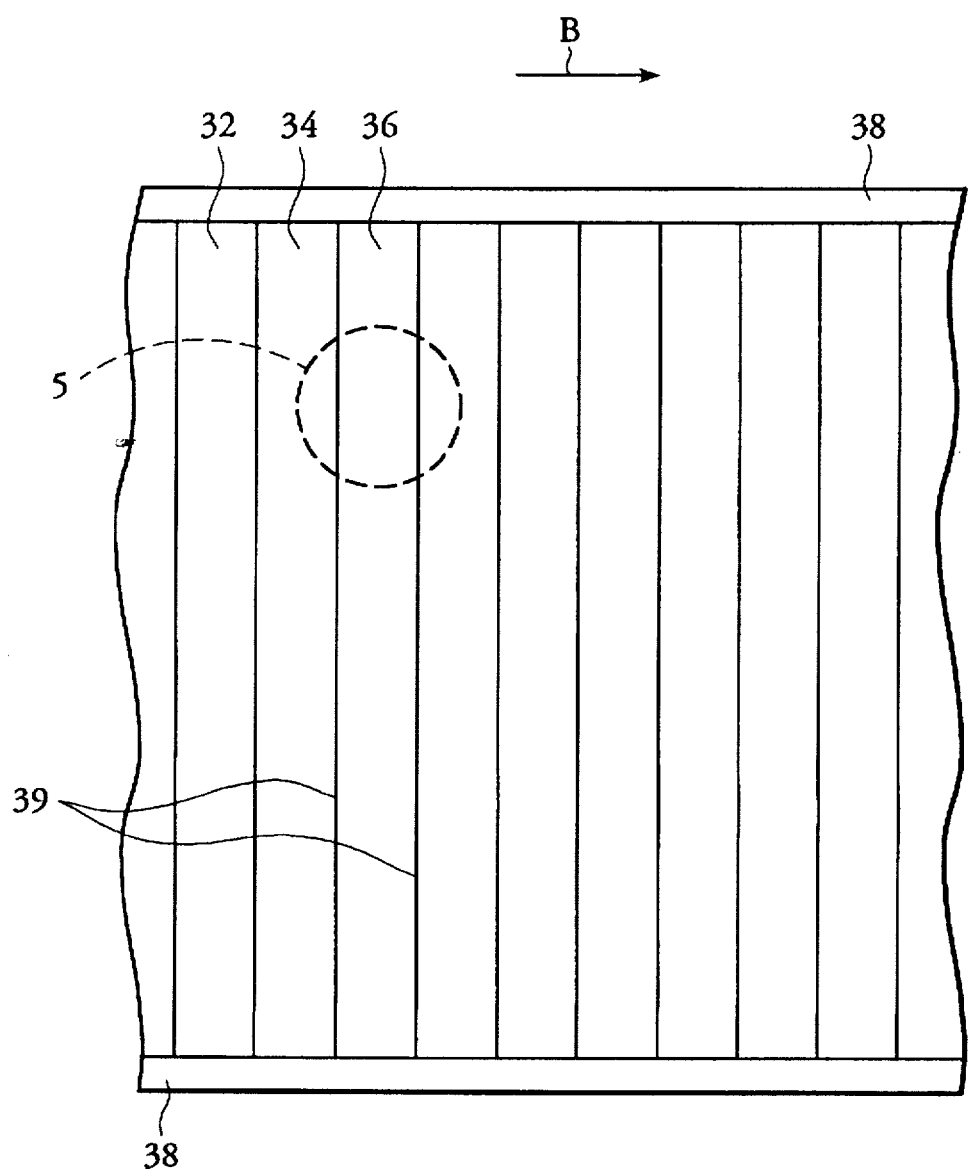
FIG. 4 is a partial top view of a paper web illustrating the scanning pattern of the present invention.

FIG. 4 shows a plurality of sequentially written image strips, 32, 34, 36 formed by the writing head 16 moving across the width of the web 14. Three strips are shown in FIG. 4 for demonstrative purposes. Typically, the number of image strips far exceeds three, with the actual number of strips written being limited by the application of the system. An unwritten border 38 is present at opposite sides of each strip. To print an image, the head scans across the width of the stationary web, writing one strip. While the head is outside the written area, the web is advanced 2.56 inches in the direction of arrow B. After the web has stopped moving, the head scans across the web in the reverse, back-scan direction to write the subsequent strip of latent image. The motion of the writing head 16 is synchronized, via control circuitry 18, with the movement of the web 14 along direction B so that a pattern of abutting strips of charge areas is formed to write a complete latent image.

Figure 5:
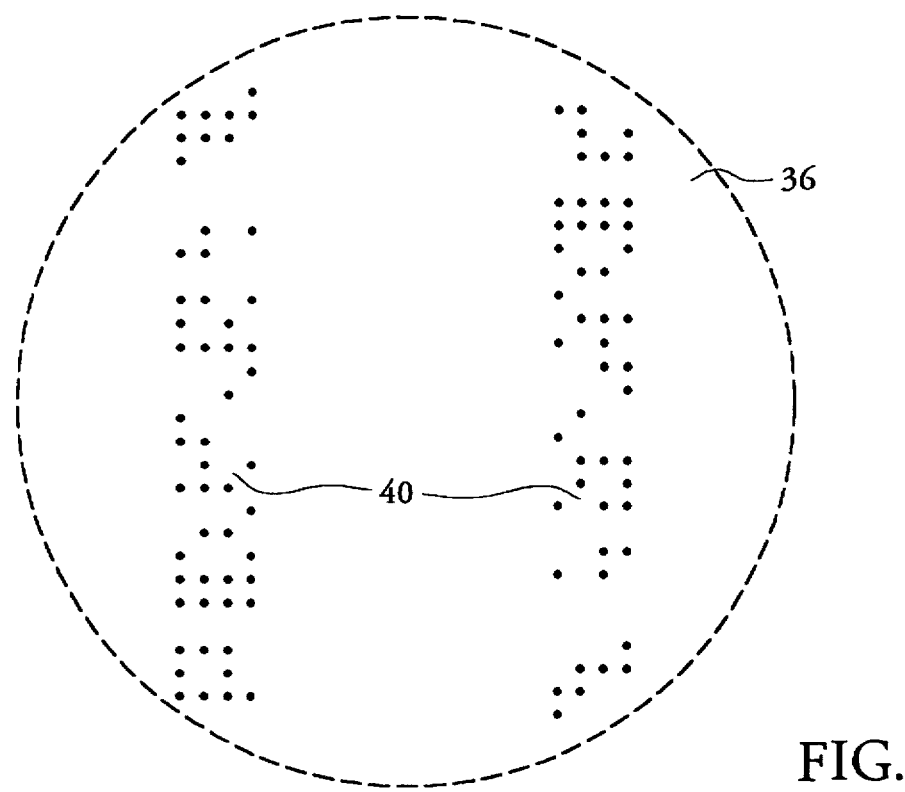
FIG. 5 is a detail view of the paper web shown in FIG. 4.

FIG. 5 shows a printing sample within a strip indicated by the dashed circle 5, shown in FIG. 4. In FIG. 5, the writing head has moved over strip 36 and charged a plurality of areas 40 forming a dot pattern. Each dot is formed by a power module, incorporated into the control circuitry 18, charging a single wire 24 of writing head 16 as discussed more fully below with respect to FIG. 6. The charge areas are merely illustrative of the writing of digital words with bit patterns which span a strip from edge to edge. The bit patterns consist of arrays of charge dots deposited by the electrodes having either writing or non-writing potentials, typically −600 volts and −250 volts, respectively. The array of charge dots subsequently is made visible upon toning by the applicator. Where a −600 volts is applied to an electrode, the resulting image dot image is toned, giving a dark dot appearance. Where −250 volts is applied to an electrode, the resulting charge dot is too weak to attract toner particles and no visible dot is created. The voltages for writing and non-writing may differ somewhat from −600 volts and −250, respectively, depending on conditions, but these are typical voltages. The actual surface potential of the latent image dot, before toning, is typically in the range −100 to −150 volts. Since the deposited charge is quite localized, the pattern appears to be a grid-like array of charge areas. Each position in the array corresponds to an image pixel which is rendered either dark or light depending upon the charge deposited. A problem encountered was the banding or darkening of the image formed near the edges 39 of a strip. It is believed that the darkening of the image near the strip edges is due to the fact that the writing return current, which must pass both along and through the image medium, experiences less impedance when the electrode is very near the end of the array of electrodes. In this fashion, the darkened edges of the written strips may be centrally disposed in an image, making them more salient to a viewer.

The banding was recognized to be caused by excess charge build-up in the areas of the paper web 14 charged by wires located near the ends of the writing head 16. To overcome the excess charge build-up, it was found that either the effective writing voltage or writing time of these "near the end" electrodes could be reduced independently of the remaining wires of the writing head 16. To that end, an RC circuit is coupled to the wires located near the ends of writing head 16 to control the effective writing time.

Figure 6:
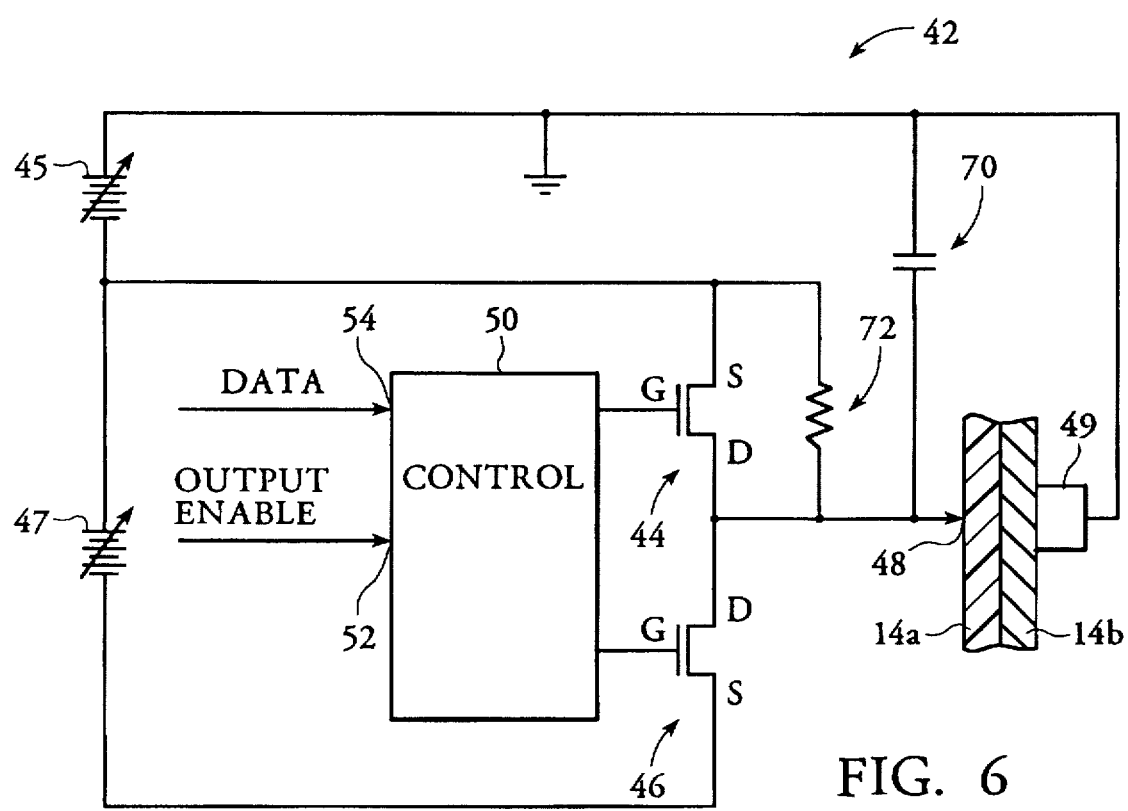
FIG. 6 is a control module used to charge a wire on the writing head shown in FIGS. 2-3, in accord with the present invention.

Referring to FIG. 6, a power module 42 is shown. In the preferred embodiment, a power module is electronically coupled to each wire near the ends of the writing head 16. Each power module 42 includes a P-Channel FET 44 and an N-Channel FET 46 coupled in series between two voltage sources. Specifically, the source of the P-Channel FET 44 is connected to voltage source 45 supplying between −200 to −300 volts, and the source of the N-Channel FET 46 is connected to a voltage source 47 supplying between −550 to −650 volts. The drains of the P-Channel FET 44 and the N-Channel FET 46 are connected in common to a wire 48 of the writing head 16 which corresponds to the power module 42. The paper web 14 is positioned so that the dielectric side 14a is adjacent to the corresponding wire 48, with the conductive backing 14b adjacent to conductor 49, commonly referred to as a backing electrode. The backing electrode 49 creates a path to ground. A switching circuit 50 is coupled to the gate of each FET 44 and 46 and includes an output enable port 52 and a data input port 54.

Figure 7A:
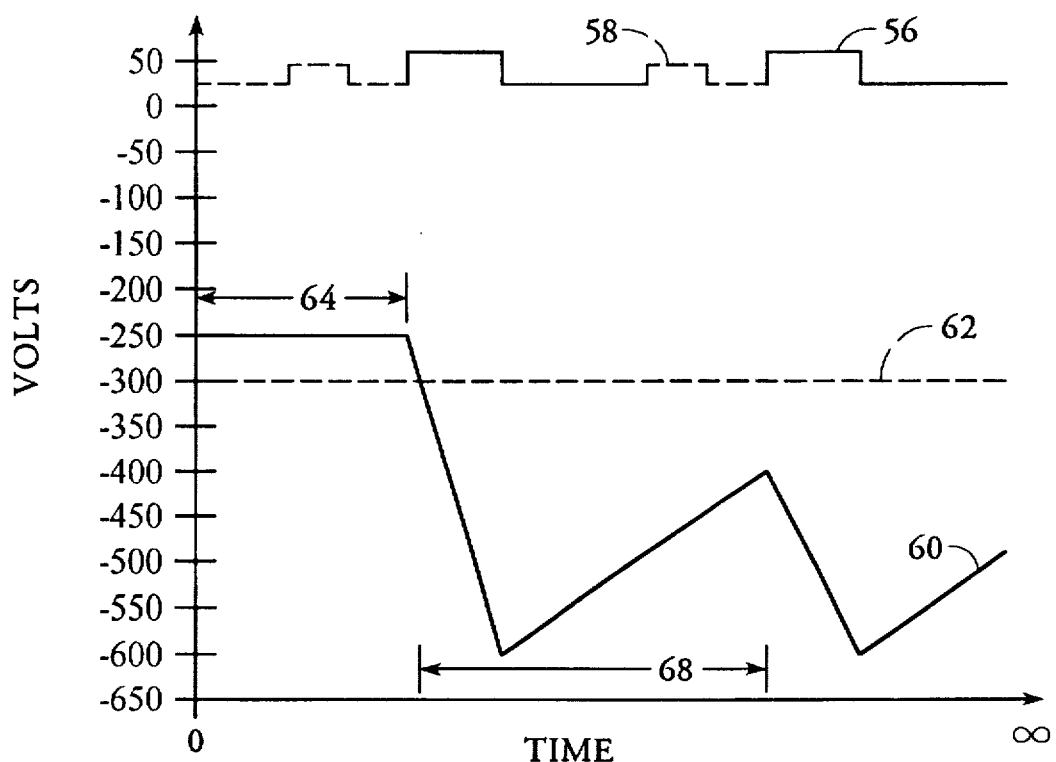
FIGS. 7A and 7B are graphs respectively comparing inputs/outputs associated with a writing head of the prior art with the inputs/outputs associated with the present invention and as a function of voltage versus time.
Figure 7B:
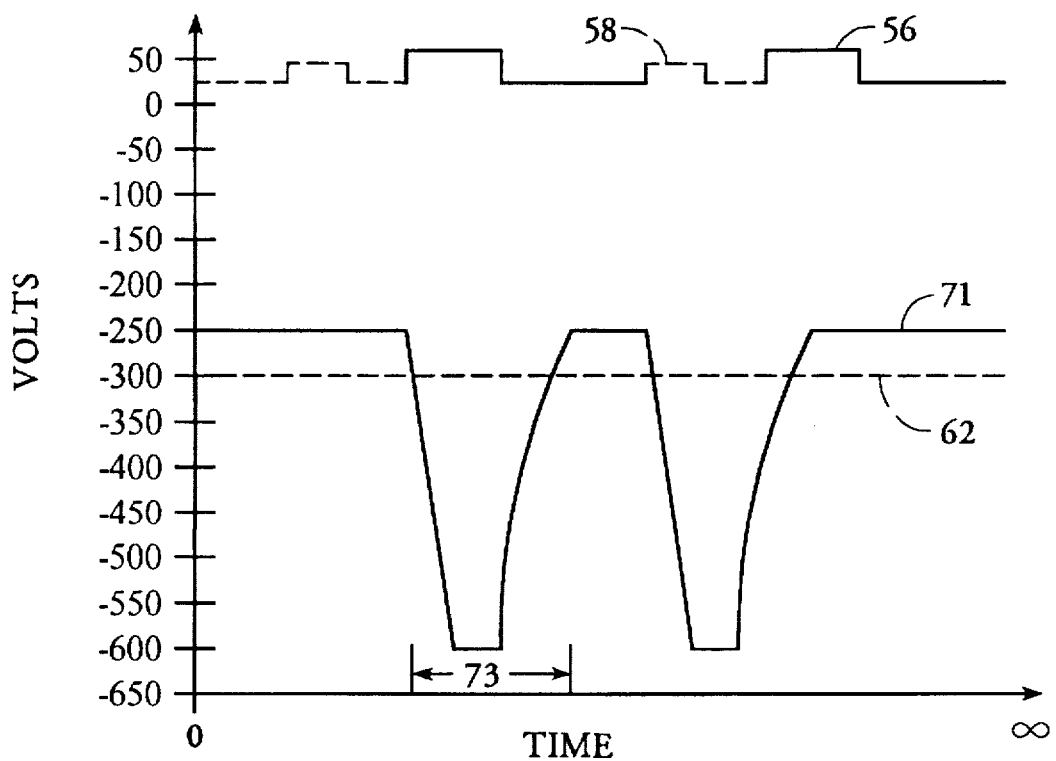

Referring also to FIGS. 7A and 7B, the voltage of the corresponding wire 48 is controlled by a control bit 56 sensed at the output enable port 52, allowing the data 58 present at the data input port 54 to establish an appropriate gate voltage on FETs 44 and 46. Data 58 is sensed at the input port 54 as a bit stream, causing the FETs 44 and 46 to alternatingly activate. In this fashion, the data causes the FETs 44 and 46 to periodically charge the corresponding wire 48 to the voltage present at the source of the FET activated, thereby producing output 60, shown as a graph in FIG. 7A. The portion 64 of the output above the writing threshold 62 represents an area on the paper web 14 where a light pixel (non-write area) would be present, i.e. no toner would be applied in that charge area. The portion 66 of the output below the writing threshold 62 represents an area on the paper web 14 where a dark pixel (write area) would be present, i.e. toner would be applied in that charge area. The nominal write time for applying a charge to a write area is approximately 100 µs. The decay time (the time for the electrode voltage to decay with both FET's in the "off" state) is shown as portion 68 of the output signal 60. The decay time is a function of a stray capacitance 70 associated with the corresponding wire 48, and is long compared to the write time, i.e., once charged, the electrode will maintain the writing voltage for a period much longer than the nominal write time. Charge dots are normally formed by holding FET 46 on for about 100 µs then switching it off and simultaneously switching FET 44 on.

To control the effective write time in the instant invention, a resistor 72 is connected between the source and the drain of the P-Channel FET 44. The resistor 72 and the stray capacitance 60 form an RC circuit with a predefined decay time/rate, typically shorter than the nominal write time. To overcome the banding problem, resistors of appropriate value are selected so that the decay rate of the RC circuit is fastest for the wires located at the ends of the writing head 16, with the decay rate incrementally slowing the further a wire is located from the ends of the writing head 16. As indicated in FIG. 7B, the corresponding output pulse 73 of output graph 71 for a power module 42 including resistor 72 provides an effective write time that is controllably shorter than a comparable pulse from a power module not including resistor 72, indicated in FIG. 7A. As seen in FIG. 7, for the same data and control bit, the portion 73 of input pulse 71, constituting the effective write time, is controllably shorter than the effective write time in graph 60, indicated by portion 68.

In the preferred embodiment, only the four wires or traces located nearest each end of the writing head 16 require an increased decay rate in order to avoid the banding problem.

To that end, each of wires or traces 74, 76, 78, 80, 82, 84, 86 and 88, shown in FIG. 5, are connected to a power module, as shown in FIG. 6. Wire or traces 74 and 82 are located on opposite sides 90 and 92 of the writing head 16. Wire or trace 80 is disposed proximate to wire or trace 74, but more distally positioned from side 90. Wire or trace 76 is positioned between wire or trace 74 and wire or trace 80, with wire or trace 78 positioned between wires or traces 80 and 76. Wire or trace 88 is disposed proximate to wire or trace 82, but more distally positioned from side 92. Wire or trace 84 is positioned between wire or trace 82 and wire or trace 88, with wire or trace 86 positioned between wires or traces 84 and 88.

Wires or traces 74 and 82 have the fastest decay rate, or shortest decay time, of approximately 25 µs. To achieve this decay rate, the resistors 72 of the corresponding power modules 42 have a value of approximately 910 Kohm. The resistors 72 of the power modules corresponding to wires or traces 76 and 84 have a value of approximately 1.2 Megohms. The resistors 72 of the power modules corresponding to wires or traces 78 and 86 have a value of approximately 1.5 Megohms, and the resistors 72 of the power modules corresponding to wires or traces 80 and 88 have a value of approximately 2.0 Megohms. It is preferred that the resistor 72 is a potentiometer so that it may be manually adjusted to achieve an optimal decay rate. Manual adjustment of the resistor 72 also allows adjustment of the print quality to overcome undesirable effect of changing moisture levels in the atmosphere. The banding problem was found to become increasingly problematic as the ambient moisture content diminishes.

In this fashion, the wires or traces 24 which are centrally disposed on writing head 16 comprise central group 95 and are flanked by a first 94 and second 96 group of wires or traces, with the first group 94 comprising of wires or traces 74, 76, 78 and 80 and the second group comprising of wires or traces 82, 84, 86 and 88. Each of the centrally disposed wires or traces 95 are attached to a power module similar to module 42, shown in FIG. 6, excepting the resistor 72. Thus, the centrally disposed wires each have a rate of decay that is substantially slower than any of the wires associated with the first 94 and second groups 96 of wires. Providing the wires with different rates of decay, as discussed above, prevents excess charge buildup in the latent image, thereby preventing dark bands from appearing in the printed image.

In addition to the elimination of visible banding by varying the value of the resistors 72, this invention provides an even simpler method of eliminating banding. For a given set of fixed resistors such as those described above, the banding can be eliminated by lengthening or shortening the write time controlled by control bit 56 sensed at output enable port 52. If the write time is shortened using control bit 56, the wires or traces 95 which are centrally disposed will write more lightly. Conversely, if the write time is lengthened, they will write more darkly. The write times for the first 94 and second 96 groups of wires or traces do not change so long as the write time controlled by bit 56 is long compared to the decay times controlled by resistors 72. This gives a convenient way to control and eliminate banding, because the relative write times of the central group 95 of wires or traces with respect to the first 94 and second 96 group of wires or traces can be controlled at will with only timing changes. No hardware changes are required. This permits the user of a printer to have the capability of eliminating banding, provided the printer manufacturer provides a control panel with an adjustable write-time feature. This could be achieved by storing a program in memory via the control panel, both of which could be associated with the control circuitry 18. The control circuitry 18 is electronically coupled to receive the program to adjust the control bit 56, as described above.

I claim:

1. An electrostatic printer, comprising:

a supply of dielectric material;

an electrostatic head means for writing an electrostatic image strip on said dielectric material, said head means including a linear array of closely spaced electrodes, positioned proximate to said dielectric material;

means, electrically coupled to said head means, for charging each said electrode of said linear array to a predetermined voltage, with each said electrode maintaining said charge for a predetermined charge time to produce an electrostatic latent image strip on said dielectric material;

control means, electrically coupled to said head means, for independently controlling the charge time of different ones of said electrodes to provide differing charge times to said electrodes of said linear array;

means coupled to said supply and head means, for synchronizing motion of said head means with said dielectric material forming a pattern of abutting strips; and means, adjacent to said head means, for applying fluid developer to said latent image, thereby producing a visible image.

2. The printer as recited in claim 1 wherein a stray capacitance is associated with each said electrode of said linear array, with said control means including a resistor coupled in series to said at least one electrode to form an RC circuit having a predetermined rate of decay, with electrodes of said array not associated with said RC circuit defining central electrodes.

3. The printer as recited in claim 2 wherein said control means includes a program means for increasing said charge time of said central electrodes, exceeding a decay time of said at least one electrode.

4. The printer as recited in claim 1 wherein said control means includes a plurality of power modules with each said power module uniquely associated with an electrode of said linear array and including first and second FETs having a drain connected in common with a corresponding electrode, with the source of the first FET connected to a first voltage source and a source of said second FET connected to a second voltage source and including a switching means for alternatingly activating said first and second FETs to periodically charge said corresponding electrode to said predetermined voltage level, with at least one power module electrode having a resistor coupled in series with said at least one electrode.

5. The printer as recited in claim 4 wherein each said power module includes first and second FETs having a drain connected in common with a corresponding electrode, with the source of the first FET connected to a first voltage source and a source of said second FET connected to a second voltage source and including a switching means for alternatingly activating said first and second FETs to periodically charge said corresponding electrode to said predetermined voltage level, with said resistor coupled between said source and drain of said second FET.

6. The printer as recited in claim 4 wherein a stray capacitance is associated with said electrodes, with said resistor forming an RC circuit having a predetermined rate of decay.

7. The printer as recited in claim 5 wherein said first FET is an N-Channel FET and said second FET is a P-Channel FET.

8. The printer as recited in claim 1 wherein said array includes a plurality of centrally disposed electrodes flanked by first and second groups of end electrodes, with said first and second groups located at opposite ends of said linear array with said control means independently controlling the charge time of the first and second groups of end electrodes to have a charge time differing from a charge time of said centrally disposed electrodes.

9. The printer as recited in claim 8 wherein said first and second groups each comprises of four end electrodes, with said control means individually controlling the four end electrodes of said first and second groups, with each of said four electrodes having a unique charge time.

10. An electrostatic printer, comprising:

a supply of dielectric material;

an electrostatic head means for writing an electrostatic image on said dielectric material, said head means including a linear array of closely spaced electrodes, positioned proximate to said dielectric material, with said array including a plurality of centrally disposed electrodes flanked by first and second groups of end electrodes, with said first and second groups located at opposite ends of said linear array;

means, electrically coupled to said head means, for periodically charging said electrodes of said array to a predetermined voltage, producing an electrostatic latent image strip on said dielectric material;

control means, electrically coupled to said head means, for independently controlling a rate of discharge of said voltage of different electrodes of said linear array;

means for synchronizing motion of said head means with said dielectric material forming a complete latent image; and means, following said head means, for applying fluid developer to said latent image, thereby producing a complete visible image.

11. The printer as recited in claim 10 wherein said first and second groups each comprises of four end electrodes, each having a spatial position with respect to said centrally located electrodes, with said control means individually controlling said four end electrodes of said first and second groups, with each of said four electrodes having a discharge time, with said discharge time being dependent upon said spatial position.

12. The printer as recited in claim 11 wherein said first and second groups each comprises of first, second, third and fourth end electrodes, with said first end electrodes positioned at opposite ends of said linear array, each of said second end electrodes positioned between said centrally disposed electrodes and said first end electrodes, each of said third end electrodes positioned between said second end electrodes and said centrally disposed electrodes, each of said fourth end electrodes being disposed between said third end electrode and said centrally disposed electrodes.

13. The printer as recited in claim 12 wherein said first end electrodes have a first discharge time, said second end electrodes have a second discharge time, greater than said first discharge time, said third end electrodes have a third discharge time, greater than said second discharge time and said fourth end electrodes have a fourth discharge time greater than said third discharge time.

14. The printer as recited in claim 13 wherein said control means includes a plurality of power modules with each said power module uniquely associated with an electrode of said linear array and including first and second FETs having a drain connected in common with a corresponding electrode, with the source of the first FET connected to a first voltage source and a source of said second FET connect to a second voltage source and includes a switching means for alternatingly activating said first and second FETs to periodically charge said corresponding electrode to said predetermine voltage level, with power modules associated with said end electrodes having a resistor coupled between said source and drain of said second FET.

15. The printer as recited in claim 14 wherein a stray capacitance is associated with said end electrodes, said resistor coupled in series to said end electrode forming an RC circuit having a predefined rate of decay.

16. The printer as recited in claim 15 wherein said resistor associated with said first end electrodes is 910 Kohm, said resistor associated with said second end electrodes is 1.2 Mohm, said resistor associated with said third end electrodes is 1.5 Mohm, said resistor associated with said fourth end electrodes is 2.0 Mohm.

17. The printer as recited in claim 15 wherein said resistor is a potentiometer.

18. An electrostatic printer, comprising:

a drum means for supporting a dielectric material, said drum means including a feeder drum and a take-up drum, spaced apart from said feeder drum, with said dielectric material traversing along a path from said feeder drum toward said take-up drum, forming a planar portion therebetween;

an electrostatic head means for writing an electrostatic image strip on said planar portion, said head means including a linear array of closely spaced electrodes, positioned proximate to said dielectric material;

means, electrically coupled to said head means, for periodically charging said electrodes to a predetermined voltage, producing an electrostatic latent image strip on said dielectric material;

control means, electrically coupled to said head means, for varying a rate of discharge of said electrodes, wherein said control means includes a plurality of power modules, with the power modules associated with different groups of electrodes of said linear array;

means for synchronizing motion of said head means with said dielectric material forming a pattern of abutting strips; and means, following said head means, for applying fluid developer to said latent image, thereby producing a visible image.

19. The printer as recited in claim 18 wherein said power module includes an N-Channel FET and a P-Channel FET, each having a drain connected in common with a corresponding electrode, with the source of the P-Channel FET connected to −300 Volts and a source of said N-Channel FET connected to −600 Volts and including a switching means for alternatingly activating said N-Channel and said P-Channel FETs to periodically charge said corresponding, with power modules associated with end electrodes positioned proximate to each end of said array having a resistor coupled between said source and drain of said second FET.

20. The printer as recited in claim 19 wherein a stray capacitance is associated with said end electrodes, with power modules associated with said end electrodes forming an RC circuit having a predefined rate of decay.

* * * * *